(12) United States Patent
Medema

(10) Patent No.: US 7,735,414 B2
(45) Date of Patent: Jun. 15, 2010

(54) CONTAINER RECEIVING UNIT WITH EVEN DISTRIBUTION OF BEVERAGE

(75) Inventor: Pieter Willem Medema, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 793 days.

(21) Appl. No.: 10/541,407

(22) PCT Filed: Dec. 4, 2003

(86) PCT No.: PCT/IB03/05923

§ 371 (c)(1),
(2), (4) Date: Jul. 1, 2005

(87) PCT Pub. No.: WO2004/060121

PCT Pub. Date: Jul. 22, 2004

(65) Prior Publication Data

US 2006/0186134 A1 Aug. 24, 2006

(30) Foreign Application Priority Data

Jan. 6, 2003 (EP) ................................. 03075056

(51) Int. Cl.
*A47J 31/06* (2006.01)
*A47J 31/46* (2006.01)
(52) U.S. Cl. .................... 99/302 R; 99/307; 99/323
(58) Field of Classification Search ............. 99/302 R, 99/295, 284, 307, 323, 304, 306, 299
See application file for complete search history.

(56) References Cited

U.S. PATENT DOCUMENTS

| | | | | |
|---|---|---|---|---|
| 3,080,810 A | | 3/1963 | Saint | |
| 3,092,012 A | * | 6/1963 | Ruhnke | 99/307 |
| 3,320,073 A | * | 5/1967 | Bixby, Jr. et al. | 426/433 |
| 4,231,876 A | | 11/1980 | Zimmermann et al. | |
| 4,882,982 A | * | 11/1989 | Muttoni | 99/295 |
| 4,916,475 A | | 4/1990 | Hori | |
| 5,473,973 A | * | 12/1995 | Cortese | 99/295 |
| 6,009,792 A | * | 1/2000 | Kraan | 99/295 |
| 6,752,070 B1 | * | 6/2004 | Lin | 99/295 |
| 6,840,158 B2 | * | 1/2005 | Cai | 99/323.1 |

FOREIGN PATENT DOCUMENTS

| | | |
|---|---|---|
| EP | 0264352 A | 4/1988 |
| EP | 1 092 377 A1 | 4/2001 |
| FR | 2338027 | 12/1977 |
| JP | 1057249 A | 3/1998 |
| WO | 200219876 A1 | 3/2002 |

* cited by examiner

*Primary Examiner*—Reginald L Alexander

(57) ABSTRACT

A container receiving unit for use in an apparatus for preparing a beverage includes a receiving space for receiving a container arranged for holding a beverage base material, a reservoir for containing beverage, and a distribution system which has an inlet connected to the reservoir, at least two outlets for dispensing beverage, and a liquid flow path extending from the inlet to the outlets. The liquid flow path has a device for reducing the speed of beverage flowing from the reservoir to the outlets during operation. The relatively high speed that is generated at an earlier stage of operation in the apparatus is diminished in the distribution system to a level at which the beverage can be distributed evenly over the outlets. In this manner all cups will be provided with an even amount of beverage.

5 Claims, 3 Drawing Sheets

CONTAINER RECEIVING UNIT WITH EVEN DISTRIBUTION OF BEVERAGE

Figure 1:
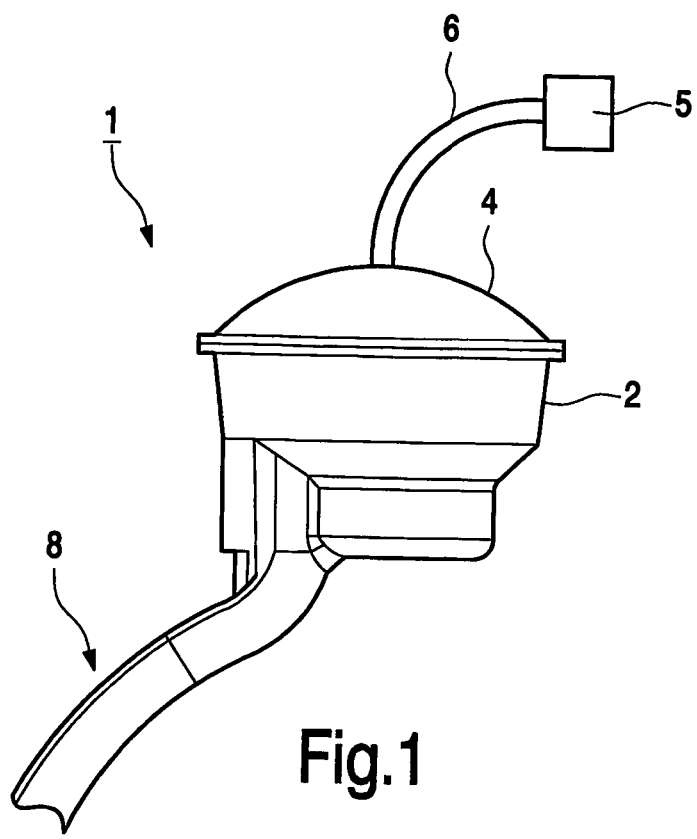

The invention relates to a container receiving unit for use in an apparatus for preparing a beverage.

The invention further relates to an apparatus for preparing a beverage comprising such a container receiving unit.

A container receiving unit for use in an apparatus for preparing a beverage of the type defined in the opening paragraphs is known from EP 1092377-A. In this known container receiving unit, a reservoir is present in which during operation a coffee extract is jetted to generate a fine-bubble froth layer on the coffee extract. The reservoir discharges via four openings into two transport channels, which transport channels each discharge in an outlet. During operation, the coffee extract is distributed from the reservoir via the openings into two flows paths through the transport channels, to discharge in the outlets from which the coffee extract is dispensed into cups. A disadvantage of the known unit is, that the coffee extract that is dispensed from the outlets is not distributed evenly over the outlets. This results in that the cups that have been filled via the outlets do not comprise a comparable amount of coffee extract.

It is an object of the invention to provide a container receiving unit in which an even distribution of beverage over the outlets is realised. To achieve this object, a container receiving unit according to the invention is characterized in that the liquid flow path comprises means for reducing the speed of beverage flowing from the reservoir to the outlets during operation.

The invention is based on the insight that the relatively high speed of the beverage in the container receiving unit disturbs the even distribution of the beverage over the outlets. By providing means in the liquid path for reducing the speed of the beverage, the relatively high speed that is generated at an earlier stage of operation in the apparatus is diminished in the distribution system to a level at which the beverage can be distributed evenly over the outlets. In this manner all cups will be provided with an even amount of beverage.

An embodiment of a container receiving unit according to the invention is characterized in that said means comprise a restriction in the liquid flow path.

An embodiment of a container receiving unit according to the invention is characterized in that said restriction comprises at least one wall extending transversally to the liquid flow path.

An embodiment of a container receiving unit according to the invention is characterized in that the restriction is V-shaped. This shape has provided good results in reducing the speed of the beverage.

An embodiment of a container receiving unit according to the invention is characterized in that two opposing triangular walls are provided extending transversally to the liquid flow path.

An embodiment of a container receiving unit according to the invention is characterized in that the liquid flow path comprises a central transport channel discharging into a buffer chamber via the restriction, said buffer chamber discharging into the outlets.

An embodiment of a container receiving unit according to the invention is characterized in that a further restriction is provided between the buffer chamber and the outlets.

An embodiment of a container receiving unit according to the invention is characterized in that a surface is provided between the buffer chamber and each outlet, which surface slants towards the outlet.

An apparatus for preparing a beverage according to the invention is characterized in that it comprises a container receiving unit according to the invention.

Figure 2:
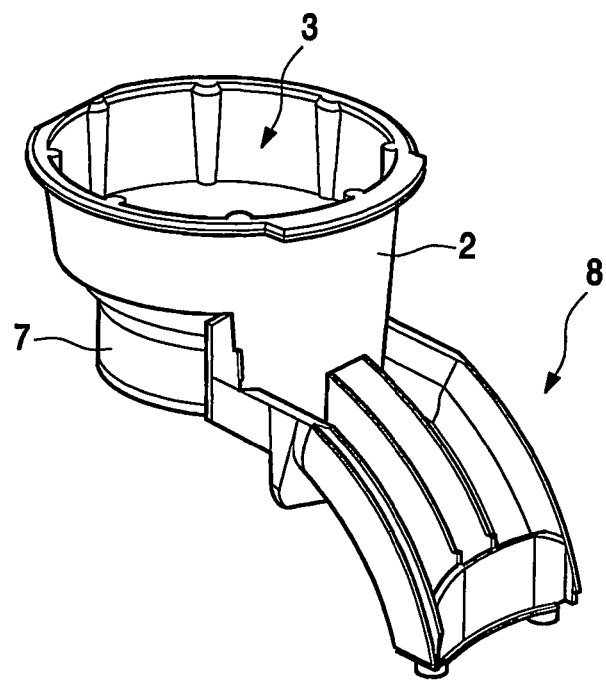
Figure 3A:
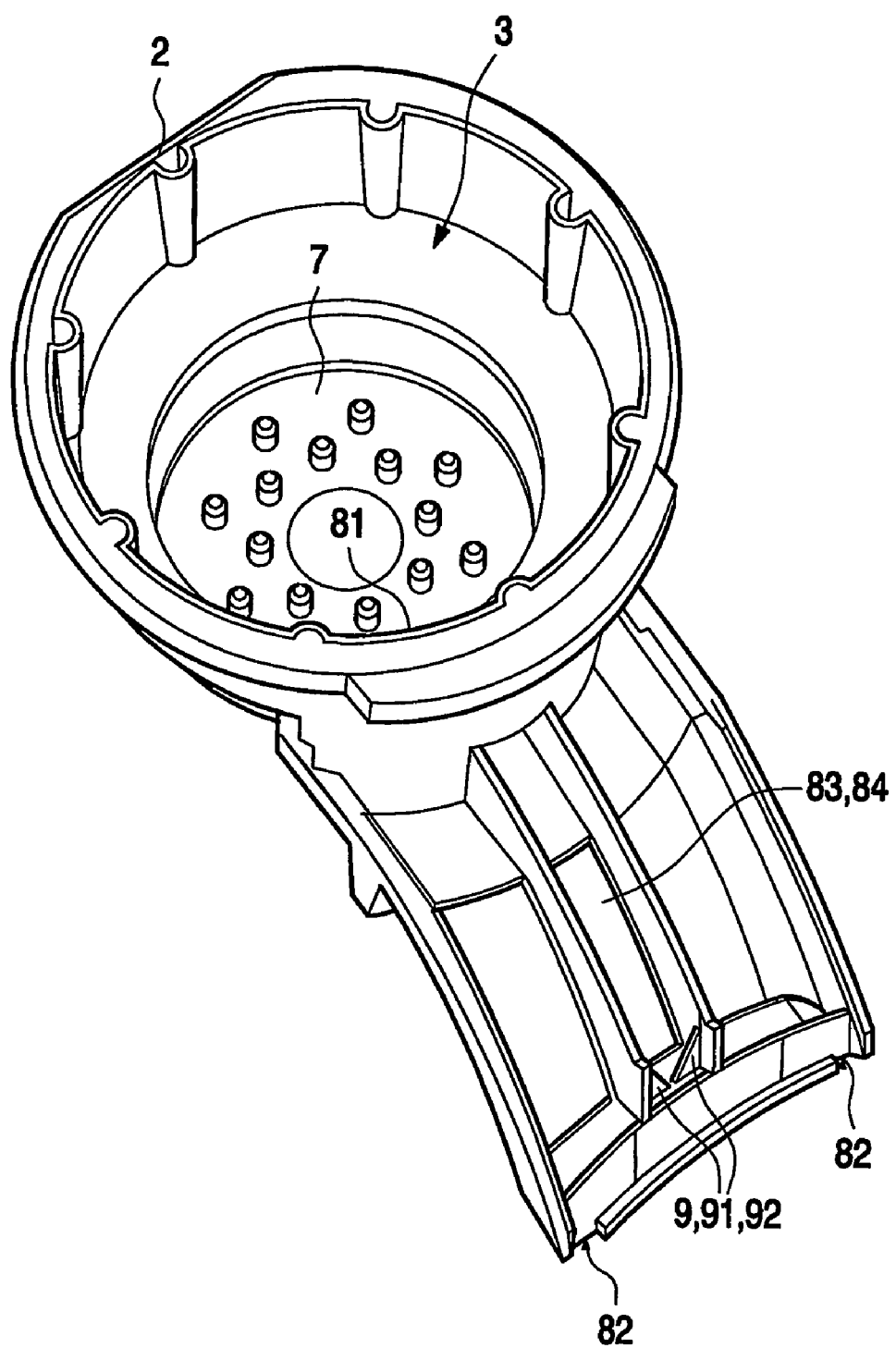
Figure 3B:
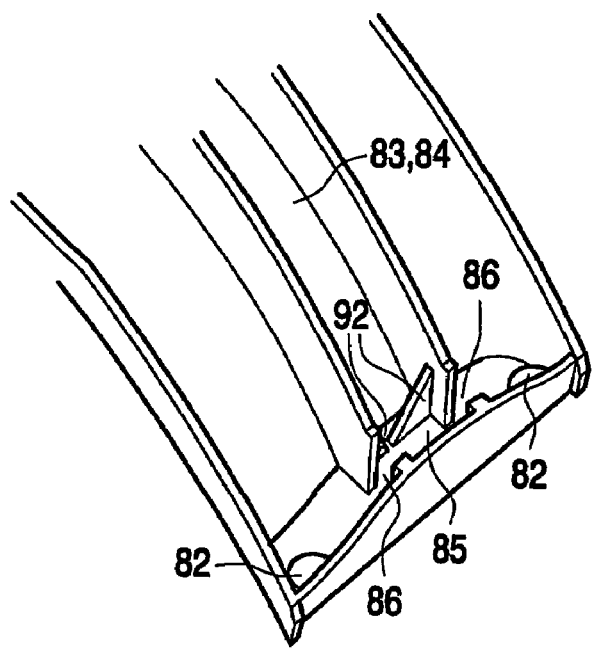
Figure 3C:
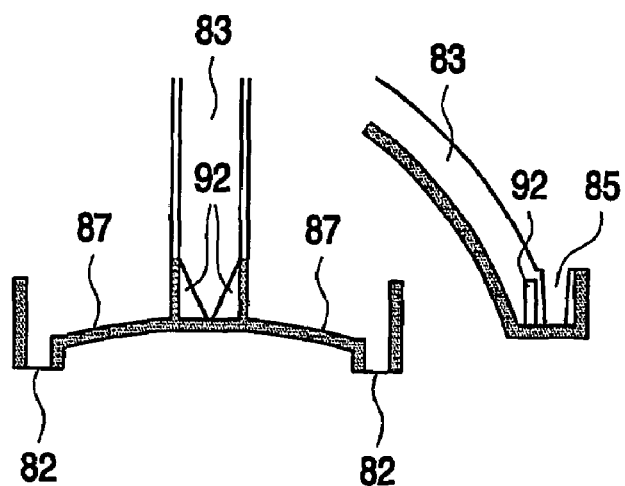

The invention will be described in more detail hereinafter with reference to the drawings, in which FIG. 1 shows a schematic side view of an embodiment of an apparatus according to the invention, FIGS. 2 and 3a show perspective views of an embodiment of a container receiving unit according to the invention, and FIGS. 3b and 3c show in further detail the distribution system of the container receiving unit of FIGS. 2 and 3a.

FIG. 1 shows an embodiment of an apparatus 1 for preparing a beverage according to the invention. The apparatus comprises a container receiving unit 2, which is provided with a receiving space 3 for receiving a container arranged for holding ground coffee. It is noted that the container may be provided with a bottom surface on which a pad filled with ground coffee can be placed, as described for example in EP1092377. It is however also possible that for example the bottom surface comprises a filtering plate, on which the ground coffee can be poured. The container is not shown in the Figures. In this embodiment, the apparatus is an apparatus for preparing a coffee extract with a fine-bubbled froth layer. In this embodiment the beverage base material held by the container therefore comprises ground coffee. It is noted however that the apparatus may also comprise an apparatus for preparing other types of beverages, such as for example chocolate milk or tea. The beverage base material will be dependent on the type of beverage the apparatus is arranged to prepare.

In this embodiment, the apparatus further comprises a removable lid 4, with which the container receiving unit 2 can be closed when the container is placed in the receiving space. Furthermore, the apparatus in this embodiment comprises a water unit 5 for supplying hot water via a transport channel 6 to the receiving space 3.

As can be seen in FIGS. 2 and 3a, the container receiving unit 2 further comprises a reservoir 7 for containing beverage. In this reservoir, a fine-bubbled froth layer is generated on the coffee extract during operation. A distribution system 8 is provided which comprises an inlet 81 connected to said reservoir 7, at least two outlets 82 for dispensing beverage, and a liquid flow path 83, extending from the inlet 81 to the outlets 82. The liquid flow path 83 comprises means 9 for reducing the speed of beverage flowing from the reservoir 7 to the outlets 82 during operation. In this embodiment, said means comprise a V-shaped restriction 91. It is noted that said means however may also comprise other types of means for reducing the speed of beverage, such as for example one or more walls with a different shape, or one or more spherical elements attached to a wall bounding the liquid flow path 83. In this embodiment, the V-shape is formed by two opposing triangular walls 92 provided in the liquid flow path and extending transversally to the liquid flow path. This is shown in more detail in FIG. 3b. It is further noted that the V-shaped restriction may for example be formed by one wall with a V-shaped recess.

The liquid flow path 83 comprises a central transport channel 84 which discharges into a buffer chamber 85 via the restriction 91. Said buffer chamber 85 discharges into the outlets 82 via further restriction 86 which is provided between the buffer chamber 85 and the outlets 82. During operation, the speed of the beverage in the central transport channel is first reduced by the walls 92. The buffer chamber is thus fed with beverage with a reduced speed, which enhances an even distribution of the beverage over the outlets. In this embodiment the liquid flow from the buffer chamber towards the outlets is further slowed down by the further restriction 86, in this embodiment formed by slits defined in the walls of the buffer chamber 85. This further enhances an even distribution of the beverage over the outlets. It is noted that the further restriction between the buffer chamber and the outlets may also be provided in another manner, for example as holes in the walls of the buffer chamber, but the slits are advantageous from a manufacturing point of view. The dimensions of the slits can be chosen to provide an optimal even flow of beverage out of the buffer chamber. Furthermore, the size of the outlets can be chosen to provide an optimal discharge of beverage.

As can be seen in FIG. 3c, a surface 87 is provided between the buffer chamber 85 and each outlet 82, which surface 87 slants towards the outlet. In this manner the liquid flow of beverage coming out of the buffer chamber is always forced to, flow towards the outlets, even if the apparatus is placed on a surface that is not completely horizontal. This further enhances the equal distribution of beverage over the outlets.

A container receiving unit according to the invention may be detachably connected to the apparatus, as described in the above mentioned embodiments. This is advantageous for cleaning purposes. Also, this container receiving unit may be sold separately from the apparatus, so that if necessary the container receiving unit can be replaced by a new one. It is noted that the container receiving unit may also form an integrated part of such an apparatus for preparing a beverage.

A distribution system according to the invention may form an integrated part of the container receiving unit, as described in the above mentioned embodiments. This is advantageous for manufacturing purposes. It is noted that the distribution system may also be detachably connected to the container receiving unit.

The invention claimed is:

1. A container receiving unit for use in an apparatus for preparing a beverage, said container receiving unit comprising:
   a receiving space for receiving a container arranged for holding a beverage base material,
   a reservoir for containing the beverage,
   a distribution system, comprising an inlet connected to said reservoir, at least two outlets for dispensing the beverage, and a liquid flow path, extending from the inlet to the outlets,
   wherein the liquid flow path comprises a two-dimensional V-shaped restriction for evenly distributing the beverage over the at least two outlets by reducing the speed of the beverage flowing from the reservoir to the at least two outlets during operation.

2. The container receiving unit as claimed in claim 1, wherein said restriction comprises at least one wall extending transversally to the liquid flow path.

3. An apparatus for preparing a beverage, comprising a container receiving unit as claimed in claim 1.

4. The apparatus as claimed in claim 3, further comprising a water unit for supplying hot water via a transport channel to the receiving space.

5. A container receiving unit for use in an apparatus for preparing a beverage, said container receiving unit comprising:
   a receiving space for receiving a container arranged for holding a beverage base material;
   a reservoir for containing the beverage;
   a distribution system comprising an inlet connected to said reservoir, at least two outlets for dispensing the beverage, and a liquid flow path, extending from the inlet to the outlets;
   wherein the liquid flow path comprises two opposing triangular walls extending transversally to the liquid flow path for reducing the speed of the beverage flowing from the reservoir to the outlets during operation.

* * * * *